Oct. 18, 1966 H. F. SCHAEFER ET AL 3,279,949
FUEL CELL HALF-CELL CONTAINING VANADIUM REDOX COUPLE
Filed July 27, 1961
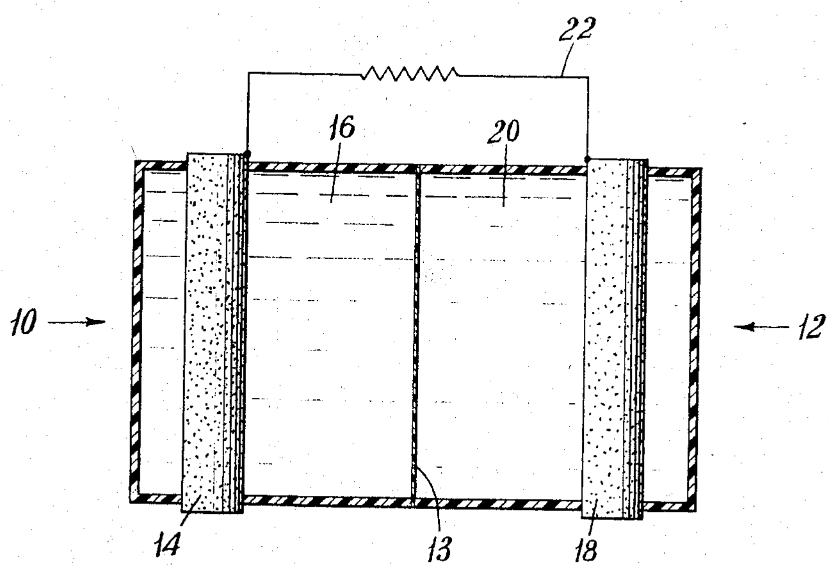
INVENTORS
HUGH F. SCHAEFER
KARL V. KORDESCH
BY John F. Hohmann
ATTORNEY United States Patent Office 3,279,949

Patented Oct. 18, 1966

3,279,949

FUEL CELL HALF-CELL CONTAINING VANADIUM REDOX COUPLE

Hugh F. Schaefer and Karl V. Kordesch, Lakewood, Ohio, assignors to Union Carbide Corporation, a corporation of New York Filed July 27, 1961, Ser. No. 127,306
5 Claims. (Cl. 136—86)

The invention relates to an electric current-producing cell, and refers more particularly to an electric current-producing cell having a redox couple in conjunction with an electrode.

A redox couple is a pair of species of matter which have definite chemical compositions, which have a mutual component existing at different valence levels, which exhibit an electromotive force in proceeding from one species to the other, and which possess the characteristic of being substantially reversible in proceeding from one species to the other. Preferably, a redox couple should be completely reversible, and should form no insoluble oxidation or reduction products. Also, the couple should include no volatile components which tend to evaporate.

When used in an electric current-producing cell, a redox couple in a suitable electrolyte can provide the reduction or oxidation potential required at one of the electrodes. Some of the redox couples known in the prior art include stannous/stannic, titanous/titanyl, and bromine/bromide. Each of these species is in the form of ions in an electrolyte except the bromine, which is dissolved in an electrolyte. The first two couples are generally used to form reducing solutions, and the latter is generally used to form oxidizing solutions.

One electric current-producinig redox cell known in the art comprises the titanous/titanyl couple in an anolyte and the bromine/bromide couple in a catholyte. Electrical energy is produced in a closed external circuit when the titanous ions are oxidized to titanyl ions and the dissolved bromine is reduced to bromide ions. The cell is regenerated by reversing the reactions. This can be accomplished by a reverse flow of imposed electric current or by reaction of the couples with suitable chemicals. In the cell described above, the anolyte is usually circulated through an external reactor where hydrogen reduces the titanyl ions to titanous, and the catholyte is similarly circulated so that oxygen oxidizes the bromide ions to dissolved bromine.

One of the major faults of the bromine/bromide couple is that the dissolved bromine tends to volatilize readily. If the bromine evaporates from the solution, the couple is lost and the cell fails to operate.

The standard electrode potentials for an oxygen electrode in acidic solutions are $E°=0.682$ for the reaction $O_2+2H^++2e^-\rightarrow H_2O_2$, and $E°=1.229$ for the reaction $O_2+4H^++4e^-\rightarrow 2H_2O$. A redox couple whose standard electrode potential falls between these values, preferably near 1.229, and whose reduced species is capable of being oxidized by oxygen should improve the operating voltage of an oxygen electrode.

It is an object of the invention to provide a novel and improved electric current-producing cell.

It is another object of the invention to provide for electric current-producing cells a novel half-cell which contains a redox couple in conjunction with an electrode.

It is another object of the invention to provide a novel half-cell for electric current-producing cells, which half-cell comprises a redox couple in conjunction with a gas electrode.

It is another object of the invention to provide a redox couple which promotes the electrochemical reactions at a gas electrode.

Broadly, the invention comprises a half-cell for electric current-producing cells, said half-cell comprising a redox couple which contains electropositive vanadium of a different valence level in each species of said couple. In a preferred embodiment, the half-cell of the invention comprises a redox couple consisting of vanadate ions, such as metavanadate ($VO_3^-$), orthovanadate ($VO_4^{---}$), and pyrovanadate ($V_2O_7^{==}$), and vanadyl ions, such as vanadylous ($VO^+$) and divalent vanadyl ($VO^{++}$). Hereinafter, the redox couple of the invention will be referred to as a vanadate/vanadyl redox couple.

In the drawing, a sectional view of an electric current-producing cell embodying the invention is shown.

It has been found that a vanadate/vanadyl couple in an acidic electrolyte, wherein vanadate ions are reduced to vanadyl ions and vanadyl ions are oxidized to vanadate ions, provides a very good redox couple for electric current-producing cells. Such a couple is substantially completely reversible in a strongly acidic electrolyte, i.e., an electrolyte having an acid concentration of about 10% to 50% by weight, and its reduced form (vanadyl) is readily oxidized either by oxygen or by electrical charging. No insoluble products form during the reaction, and no volatile components evolve. Moreover, the oxidized form of the couple (vanadate) can be reduced to vanadyl by chemical reaction with hydrogen or by a reverse electric current.

When the electrolyte compartment of an oxygen electrode contains the vanadate/vanadyl couple, the couple promotes the operation of the oxygen electrode and increases the electrode potential at which the electrode can operate. The couple also permits one to avoid the problems involved in optimum wetproofing of a gas electrode. In fact, complete wetting of such an electrode is desirable in such a system, since the working area of the electrode is thereby increased.

The vanadate/vanadyl couple of the invention is substantially completely reversible in a strong electrolyte of hydrochloric acid in water. In other conventional acidic electrolytes, such as aqueous solutions of sulfuric acid, hydrofluoric acid, and phosphoric acid, it has been found that small amounts of nitric acid and hydrobromic or hydrochloric acid promote the reversible regeneration of vanadyl to vanadate, or vanadate to vanadyl.

The vanadate/vanadyl couple can be placed in the cell electrolyte by any suitable means, one of which is a soluble salt containing a vanadyl or vanadate radical. Sodium vanadate, ammonium vanadate, vanadyl chloride and vanadyl sulfate are examples of such a salt. The electrolyte preferably contains a high concentration of the salt, such as a saturation concentration.

Referring to the drawing, the electric current-producing cell there shown consists of two half-cells 10 and 12 separated by a semipermeable membrane 13. Half-cell 10 comprises a minutely porous tubular anode 14 suitable for the ionization of hydrogen gas, and surrounding the anode 14, an anolyte 16 suitably composed of an aqueous solution of hydrochloric acid. The anode 14 is made of activated carbon impregnated with platinum black, but any suitable hydrogen ionization electrode may be used.

The half-cell 12 comprises a minutely porous tubular cathode 18 suitably made of activated carbon and, surrounding the cathode 18, a catholyte 20. The catholyte 20 is an aqueous solution of hydrochloric acid which contains a saturated concentration of sodium vanadate ($NaVO_3$). The sodium vanadate provides a vanadate/vanadyl redox couple at the cathode 18.

The anode 14 and cathode 18 are connected by an external circuit 22. Hydrogen gas is supplied to the inside of the tubular anode 14, and oxygen gas is supplied to the inside of the tubular cathode 18. The anolyte 16 is prevented from entering the inside of the anode 14 by a combination of surface tension in the minute pores of the anode 14 and a regulated hydrogen gas pressure. At the cathode 18, the catholyte 20 is prevented from entering the cathode 18 in the same way.

During the production of electrical energy, the hydrogen gas diffuses through the minutely porous anode 14 and ionizes to form hydrogen ions and electrons. The electrons are supplied to the external circuit 22 and the hydrogen ions diffuse through the membrane 13 into the catholyte 20. At the cathode 18, vanadate ions are reduced to vanadyl ions, thereby taking the electrons supplied by the hydrogen ionization from the external circuit 22.

Water is produced at the cathode 18 by a combination of hydrogen ions which diffuse across the membrane 13 and oxygen made available by the reduction of vanadate ions and the reduction of oxygen gas. The vanadyl ions which are formed in the reaction are oxidized back to vanadate ions by chemical reaction with the oxygen gas which diffuses through the cathode 18.

The water formed in the reaction can be removed from the electrolyte by any of the conventional means, such as external distillation. It is obvious that the above cell is a hydrogen-oxygen fuel cell, but such as cell, with the vanadate/vanadyl redox couple, operates at higher voltages than the conventional hydrogen-oxygen fuel cell due to a higher potential produced at the oxygen cathode. Moreover, it will be obvious to those skilled in the art that this same voltage gain can be obtained when anodic materials other than hydrogen are used. The following examples illustrate the voltage gained by the use of the vanadate/vanadyl redox couple.

*Example I*

A porous carbon oxygen electrode was operated at room temperature and at a current density of 20 ma./cm.$^2$ in a strong (19%–39% by weight) hydrochloric acid electrolyte. Without the redox couple of the invention, the oxygen electrode potential was about 1:1 volts against cadmium, but the same electrode operated at about 1.6 volts when a vanadate/vanadyl redox couple was placed in the electrolyte in a 1 molar concentration. Such a cell has also operated at 1.5 to 1.7 volts for more than 24 hours at a temperature of 80° C. and a currenty density of 50 ma./cm.$^2$.

*Example II*

A porous carbon oxygen electrode was operated at room temperature and at a current density of 20 ma./cm.$^2$ in a strong (about 50%) sulfuric acid electrolyte. Without a vanadate/vanadyl redox couple in the electrolyte, the oxygen electrode potential was about 0.6 volt against cadmium, but with the redox couple, the potential increased to about 1.45 volts.

However, it was found that the potential decreased from 1.45 volts to 0.8 volt within about 10 minutes, indicating that the oxygen gas was not regenerating (oxidizing) the vanadyl ion at the porous carbon electrode. 4 to 5 milliliters of concentrated hydrobromic acid per 200 milliliters of catholyte and 4 to 5 milliliters of concentrated nitric acid per 200 milliliters of catholyte were added to the oxygen electrode electrolyte, and it was found that the electrode potential would remain at 1.45 volts for days, indicating that small amounts of these two acids promote the reversible regeneration of the vanadate/vanadyl redox couple.

It was also found that concentrated hydrochloric acid could be substituted for the hydrobromic acid to promote the reversible regeneration. Also, small amounts of nitric acid and hydrobromic acid should be similarly added to electrolytes composed of aqueous solutions of hydrofluoric acid and/or phosphoric acid. In hydrochloric acid electrolytes, however, these small additions are not necessary.

Obviously, in the above-described fuel cell, the regeneration of the reduced species of the redox couple can take place externally of the cell. Also, the redox couple can be regenerated by an imposed reverse electric current, or by suitable chemicals other than oxygen. Moreover, the redox couple can be employed at an anode instead of a cathode, the vanadyl ions being oxidized to vanadate ions at an anode to produce electrons for an electric current. Hydrogen gas or equivalent materials will regenerate the couple by chemically reducing the vanadate ions to vanadyl ions.

The redox system of the invention is considered to be independent of any particular cell construction or shape, or of any particular reducing or oxidizing agents. Also, the invention by its very nature is not limited to any particular electrode materials or electrode constructions.

What is claimed is:

1. A fuel cell half-cell comprising an activated porous carbon gas electrode, a strongly acidic inorganic electrolyte, and in said electrolyte a redox couple consisting of vanadate ions and vanadyl ions.

2. The half-cell defined in claim 1 wherein said electrolyte is an aqueous solution of hydrochloric acid.

3. The half-cell defined in claim 1 wherein said electrolyte is an aqueous solution of at least one of the group consisting of phosphoric acid, sulfuric acid and hydrofluoric acid, and further contains small amounts of nitric acid and at least one of the group consisting of hydrochloric acid and hydrobromic acid.

4. A fuel cell half-cell comprising an activated porous carbon oxygen gas electrode, a strong hydrochloric acid electrolyte, and in said electrolyte a redox couple consisting of vanadate and vanadyl ions.

5. A fuel cell half-cell comprising an activated porous carbon oxygen gas electrode, a strong sulfuric acid electrolyte containing small amounts of nitric acid and hydrobromic acid, and in said electrolyte a redox couple consisting of vanadate ions and vanadyl ions.

References Cited by the Examiner

UNITED STATES PATENTS

| | | | |
|---|---|---|---|
| 2,897,249 | 7/1959 | Glicksman et al. | 136—154 |
| 2,901,522 | 8/1959 | Bopp | 136—154 |
| 3,000,996 | 9/1961 | Usel | 136—120 |
| 3,032,600 | 5/1962 | Mayer | 136—6 |
| 3,152,013 | 10/1964 | Juda | 136—86 |

FOREIGN PATENTS 761,948 11/1956 Great Britain.

OTHER REFERENCES

Chem. Abstracts, 49:12813i, 1955.

Status Report on Fuel Cells, June 1959, pp. 60–62.

WINSTON A. DOUGLAS, *Primary Examiner.*

JOHN R. SPECK, JOHN H. MACK, H. FEELEY, A. B. CURTIS, *Assistant Examiners.*